United States Patent
Kimura et al.

[15] 3,639,734
[45] Feb. 1, 1972

[54] POSITIONAL INDICATING DEVICE FOR NUMERICAL VALUE

[72] Inventors: Takehiko Kimura, Tokyo; Yoshiaki Niizawa, Kawasaki-shi, both of Japan

[73] Assignee: Canon Camera Kabushiki Kaisha, Tokyo, Japan

[22] Filed: Dec. 29, 1965

[21] Appl. No.: 517,251

[30] Foreign Application Priority Data

Dec. 30, 1964 Japan....................................39/74770
Dec. 30, 1964 Japan....................................39/102878

[52] U.S. Cl..........................235/92 EA, 235/64.3, 235/155, 235/169, 340/378
[51] Int. Cl.......................................................G06k 15/18
[58] Field of Search...................340/172.5, 378 R, 324, 378, 340/372, 380; 235/92, 155, 169, 64.3

[56] References Cited

UNITED STATES PATENTS 3,041,600 6/1962 Gumpertz et al. .................340/324 X
3,358,125 12/1967 Rinaldi....................................235/92

Primary Examiner—Maynard R. Wilbur
Assistant Examiner—Leo H. Boudreau
Attorney—Anton J. Wille and Michael N. Meller

[57] ABSTRACT

A numerical value indicator comprising an indicating device for grouping the digits of a numerical value into groups of "$n$" digits with respect to the variable position of the decimal point. A decimal point indicator is operated to indicate the position of the decimal point within a numerical value, means being provided for selecting from a plurality of digit grouping indicators the one indicator which includes the digit grouping indicator positioned at the same location as the operated decimal point indicator.

4 Claims, 13 Drawing Figures

POSITIONAL INDICATING DEVICE FOR NUMERICAL VALUE

This invention relates to a device used in computers, automatic control systems and the like for indicating a numerical value of the variable position type where a decimal point is automatically indicated.

In numerical value indicating devices, where the digits included in a numerical value are significant, it is difficult to read or sense such value at once. It is customary to read a numerical value by setting the decimal point as the base point and dividing the numerical value every three figures with spaces or commas with reference to the base point.

According to the present invention it is easy to read numerical values having a significant number of figures by automatically inserting a comma in the numerical value indicator to group the digits.

In the prior art, there are indicators of the fixed decimal point type where each group of digits, generally in groups of three, appearing before or after the fixed decimal point, are illuminated by lamps to permit easy reading of the numerical value. In the fixed point type indicator each figure was stressed or exhibited with the aid of a lamp fixed at the position corresponding to each fixed figure position, respectively.

However, when decimal point is variably positionable by irregularly shifting within all figures, it is apparent that digit groupings shift as the decimal point shifts, with the result that the fixed type illuminating means becomes inapplicable.

An object of the present invention is to provide an automatic positional indicating device of a numerical value having a variably positionable decimal point where the numerical value is divided into a certain number of figures on the basis of the position of decimal point and considering the divided unit as one group; then shifting the position of the decimal point by one figure, and dividing the numerical value into a certain number of figures on the basis of the newly assigned position of the decimal point to constitute another group. Thus when the numerical value is separated into $m$ figures, $m$ times shiftings of the decimal point are made successively to obtain $m$ group divisions. Assuming $m$ equals 3, the position of decimal point is shifted three times, each shift being made by one figure, to obtain three groups of such division; and selecting one group corresponding to the assigned position of decimal point, and exhibiting the figuring indication using the selected group.

According to one aspect of the present invention the selection of the group corresponding to the assigned decimal point position is manually made to stress or emphasize the grouped numerical value.

According to another aspect of the present invention, the selection of the group corresponding to the assigned decimal point position is automatically made to stress the grouped numerical value.

Another object of this invention is to provide an indicating device of numerical values by separating such values into groups having a certain number of digits by utilizing a very simple electronic circuit and optical means. With the arrangement of this invention, difficulties in reading numerical values having a large number of digits are eliminated, which contributes in improving the capability of an automatic positional indicator of numerical values.

A further object of this invention is to provide an automatic positional indicator of numerical values having "OR" circuits for simultaneously indicating divisional spaces of every $m$ group, for example, three figures on the basis of the position of decimal point with the aid of a set signal which is produced when the position of the decimal point in a variable position type is automatically or manually set.

Another object of this invention is to provide an automatic positional indicator of a numerical value having "OR" circuits for separating the numerical value into groups of digits, for example, three figures on the basis of decimal point regardless of its position in a numerical value.

Still another object of this invention is to provide an automatic positional indicator usable for computer systems of a numerical value having "OR" circuits for separating the numerical values into groups of digits, for example, three figures on the basis of the decimal point regardless of its position in a numerical value.

A further object of this invention is to provide an automatic positional indicator of a numerical value having "OR" circuits for dividing the numerical value into groups of digits only of the higher order of figures than the order of the decimal point without separating the lower order figures.

Yet another object of this invention is to provide an automatic positional indicator of a numerical value having "OR" circuits, for separating the numerical value into a plurality of groups corresponding to the shift of the decimal point, and introducing light tubes having branches for respective groups to illuminate each group with one lamp.

Other objects, advantages and features of this invention will become more apparent from the following description of an illustrative embodiment in conjunction with the accompanied drawing in which:

FIG. 12 is a timing chart of the operation of the numerical converter of FIG. 11, while

Figure 1:
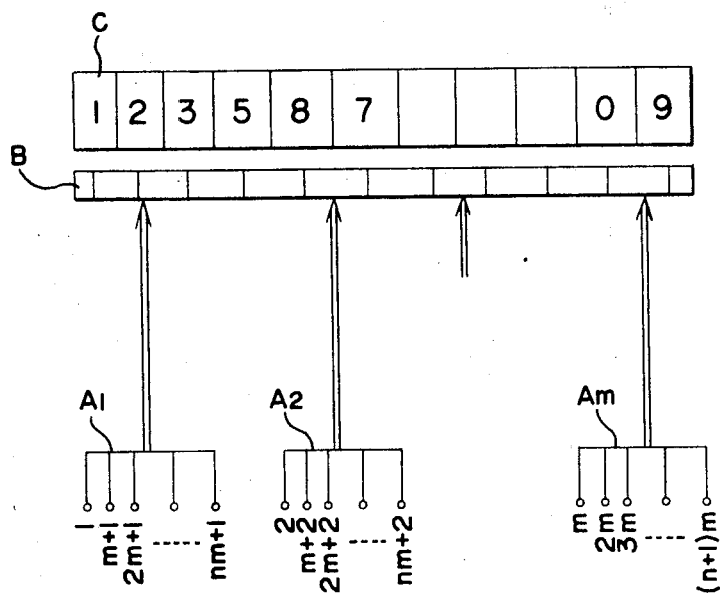
FIG. 1 shows a schematic drawing illustrating the principle of figuring a numerical value of this invention.

Now, referring to FIG. 1, the basic principle of separating a numerical value by every $m$ figures according to this invention is explained. In this figure, C shows a numerical value indicating device in which an example of a numerical value of 123587 ... 09 is shown, B shows an electrical or optical figure indicating device, which indicates grouping marks, for example, commas, between groups of digits forming the numerical value. Figure indicating device B is connected to input terminal groups consisting of $A_1$ through $A_m$ and indicates the digit grouping of the numerical value by a signal coming from either one of the input terminal groups $A_1$ through $A_m$.

Input terminal group $A_1$ consists of terminals designated 1, $m+1$, $2m+1$, ..., $nm+1$; group $A_2$ consists of terminals designated 2, $m+2$, $2m+2$, ..., $nm+2$; and group $A_m$ consists of terminals designated $m$, $2m$, $3m$, ..., $(n+1)m$. In general, when a numerical value is given by $m$ figures, the decimal point is assigned to this value and then the location of the decimal point is successively shifted by one figure to get $m$ groups, each group being obtained for each position of the decimal point.

For example, for $A_1$ group, when the decimal point is assigned to the first figure, i.e., "9.," the number of figures to be figured by every $m$ figures are $m$, $m+1$, $2m+1$, $3m+1$, ..., $nm+1$, where $n$ is a natural number relating to the highest order of the figures of the numerical value to be treated.

When the decimal point is shifted by one figure, i.e., "0.," then the number of digits to be separated by $m$ figures are $m+2, 2m+2, 3m+2, \ldots nm+2$, as shown in $A_2$ group. Thus by successively shifting the position of decimal point by one figure, we can obtain $m$ groups, i.e., $A_1, A_2, \ldots A_m$, corresponding to the $m$ times shifts of the position of decimal point. Such divisions into $m$ groups will simplify the display emphasis.

Considering $A_1$ group of digit groupings, a signal on any terminal of the $A_1$ group will not affect the positions at which the numerical value is to be divided and stressed. In accordance with the invention the positions of decimal point which do not affect the grouping of the digits are treated as one group, and selecting any one of such groups corresponding to the position of decimal point (in FIG. 1, $A_1$ group being selected), obtains a figure indication corresponding to the selected group. Thus when separation is made by every $m$ number of digits, $m$ groups according to the positions of decimal point are provided, and either one of groups is selected according to the assigned position of decimal point, thereby providing a very simple positional indication.

Figure 2:
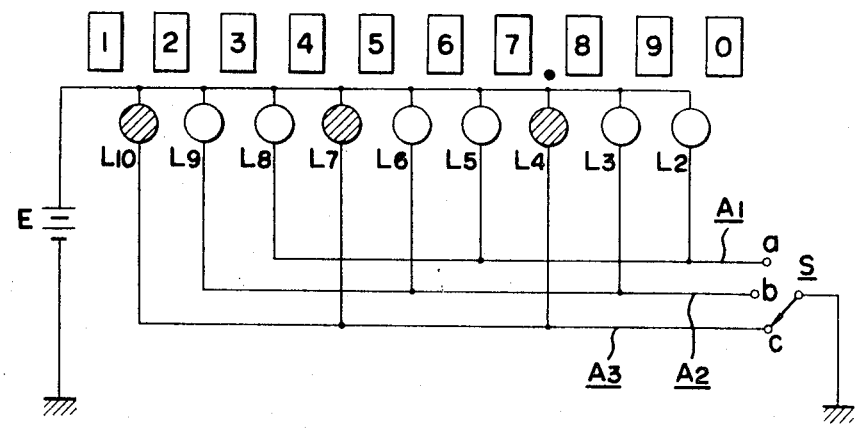
FIG. 2 shows an embodiment of this invention manually selecting a group of figures corresponding to the position of decimal point.

FIG. 2 shows an embodiment, in which the selection of the groups is manually made. In this FIG., the value presented in the frames of the indicator is 1234567.890. For grouping this value in groups of three figures the arrangement in this embodiment is as follows:

Lamps $L_2$ to $L_{10}$ are provided for illuminating respective figures and these lamps are divided into three groups, i.e., $A_1(L_2, L_5, L_8)$, $A_2(L_3, L_6, L_9)$ and $A_3(L_4, L_7, L_{10})$, each group comprising lamps positioned in three places. The lamps included in each group are connected in parallel to an electrical source E and to one of the contacts $a$, $b$, or $c$ of the switch S.

With this arrangement, when decimal point includes the fourth figure, i.e., "7.," that is the location of lamp $L_4$, $A_3$ group ($L_4$, $L_7$, $L_{10}$) is lighted by turning the switch S to its contact C. Thus positional indication is readily readable by illuminating lamps $L_7$ and $L_{10}$ on the basis of the decimal point position. Similarly, when decimal point shifts to the third figure, i.e., "8.," the dividing positions are the locations of lamps $L_3$, $L_6$, $L_9$, i.e., group $A_2$, while when decimal point shifts to the second figure, i.e., "9.," the dividing positions are the locations of lamps $L_2$, $L_5$, $L_8$, i.e., group $A_1$. In addition, when the decimal point shifts to any location, the dividing positions correspond to either one of groups $A_1$, $A_2$ or $A_3$. Thus according to the shift of decimal point, either one of the groups is selected by turning the switch to the corresponding contact, and only the lamps included in the selected group are lighted.

As above explained, the selection of the group is, as shown in FIG. 2, manually made by moving the switch S to the observed position of the decimal point. However, when the decimal point is variably positionable as in computers or automatic control devices, it is inconvenient and troublesome works to select manually a group.

Figure 3:
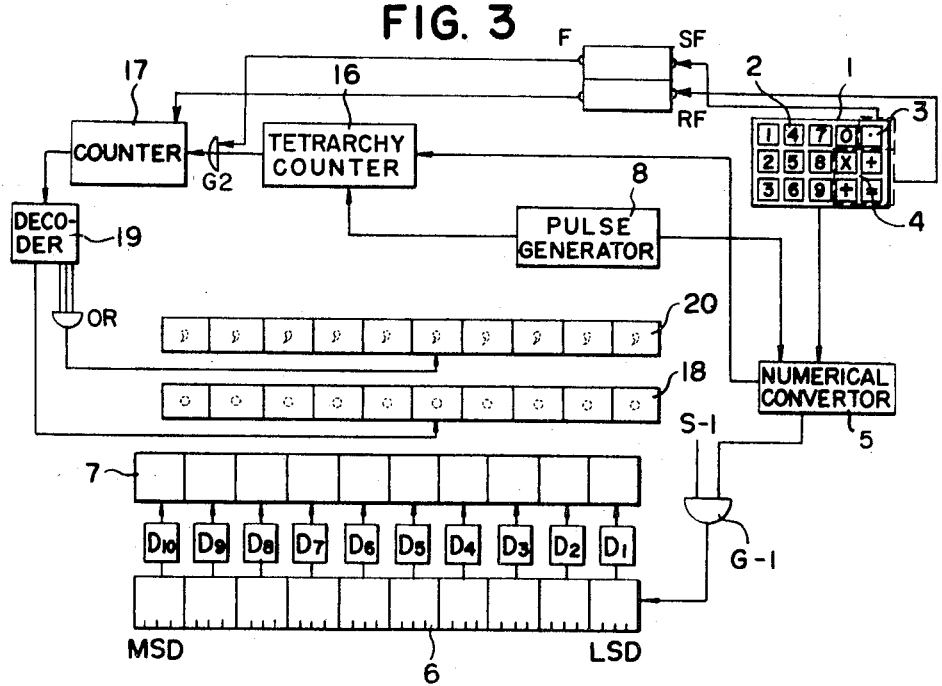
FIG. 3 shows a schematic drawing of positional indicator of numerical value of this invention embodied in a digital desk computer.
Figure 4:
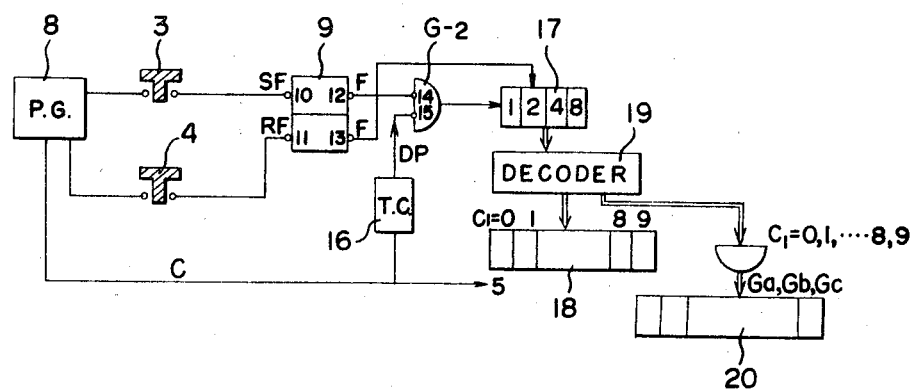
FIG. 4 shows a block diagram of a circuit for manually setting a decimal point in the indicator according as registering key "." is pushed.
Figure 5:
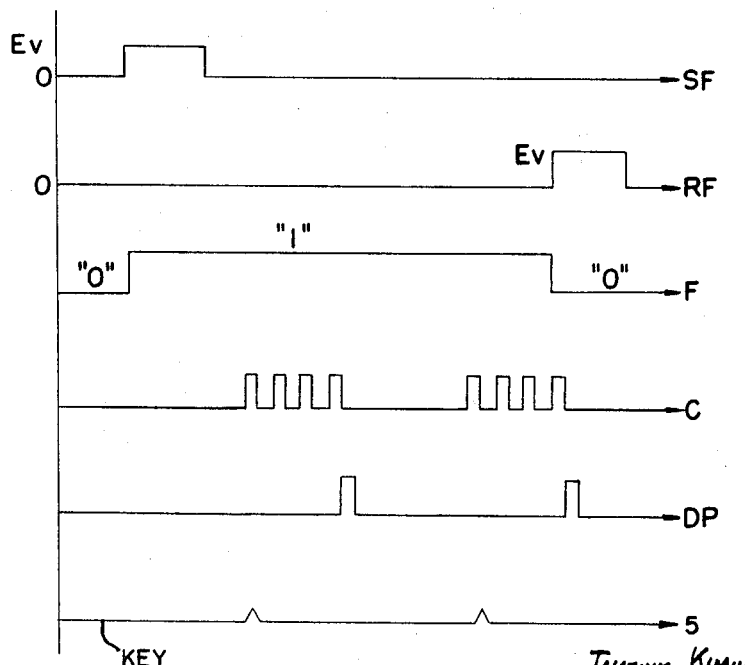
FIG. 5 shows pulse waves produced by pulse generator shown in FIGS. 3 and 4.

To overcome such defects, another embodiment enabling automatic selection of a group in accordance with the position of decimal point is shown in FIGS. 3 to 5, where the indicating portions of a numerical value and a position of decimal point of digital-type miniature computer having numerical value indicator of the type to set numerical value in the form of floating decimal point are shown.

FIGS. 6 to 10 show a similar device as shown in FIGS. 3 to 5 provided with an additional device in accordance with the present invention for enabling automatic separation of numerical values.

In FIG. 3, which shows a positional indicator of this invention to be used for a computer, a registering key board 1 is provided for inserting values into the computer, board 1 being provided with various keys to insert values and orders for calculation. These keys comprise keys 2 for numerical values from 0 through 9, key 3 for decimal point, and various order keys 4, i.e., "X" for multiplication, "" for division, "+" for addition, "−" for subtraction and "=" for equal.

Numeric converter 5 converts decimal numeric inserted by the registering key 2 into 1, 2, 4 and 8 binary code and opens gate G-1 by signal S-1 to send a signal to the least significant digit LSD of register 6 to register the numeric therein.

Register 6 shown in FIG. 3 includes 10 digits and comprises flip-flop circuits to provide one figure or digit with four bits, or pulses. Register 6 is a conventional shift register of the type for successively shifting a numeric registered at the least significant digit figure LSD to higher significant digit figures. Decoders D1 through D10 are connected to respective figures of register 6 and to decimal code indicator 7. Binary code of the numerical value registered in register 6 is converted into decimal code and simultaneously, the thus converted decimal code is expressed in decimal code indicator 7 through decoders.

FIG. 4 shows parts necessary for the decimal point indication which are included in the devices shown in FIG. 3. The means for decimal point indication will be explained with reference to FIGS. 3 through 6.

In FIG. 4, 8 is a pulse generator, and when the decimal point "." key 3 of key board 1 is depressed, set signal SF is given to terminal 10 of a flip-flop circuit 9 by the pulse generator 8. Flip-flop 9 may be of a conventional type, and when set signal SF is given to terminal 10, output signal "1" (conductive state) is produced at terminal 12.

When reset signal RF is applied to terminal 11, output signal "0" (nonconductive state) is produced at terminal 12. Reset signal RF is produced by pulse generator 8 when one of order keys 4 on key board 1 is depressed.

Output terminal 12 of the flip-flop circuit 9 is connected to the gate terminal 14 of a pulse gate G-2, which gates the hereinafter described digit pulse DP by output signal of the flip-flop. One digit pulse DP is produced for every depression of key 2. When key 2 is depressed to convert decimal code into binary code by means of converter 5, it is necessary to provide four pulses, i.e., four bits, for one decimal numeric. As shown in FIG. 4, numeric converting pulses C sent to converter 5 is frequencially divided into one-fourth the number of pulses C by means of tetrarchy counter 16 for giving gate input 15 one digit pulse DP for every four pulses C passing therethrough. Pulses C are always given to converter 5 by the pulse generator 8, which weights every four bit pulses corresponding to decimal value.

Figure 6:
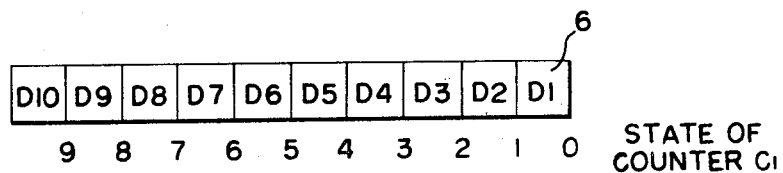
FIG. 6 shows a relationship between indicating register and counter.

Upon the depression of the decimal point key 3, the flip-flop 9 is set, and output signal from the flip-flop 9 is applied to AND gate. Thereafter, when the digit key 2 is depressed, a digit pulse is entered into the shift register 6 through the numerical converter 5, and simultaneously digit pulse DP from the tetrarchy counter 16 opens AND-gate G-2 in cooperation with the output signal from the flip-flop 9. Digit pulse DP passed through the AND-gate G-2 is counted by the counter 17. Counted accumulations are converted to decimal code by means of the decoder 19. Converted code signal is directed to the decimal point indicator to indicate the decimal point position. The converted code signal is also directed to the figuring indicator 20 to provide a positional indication. In such manner, the decimal point and figuring indications are provided for lower order than the order of the decimal point. Since the maximum number of figures to be expressed by the computer used in this embodiment is 10, counter 17 is a 1, 2, 4, 8 decimal counter enabling the counting up to ten. As apparent from FIG. 3, the decimal pint occupies one of 10 locations corresponding to expressed numerical value having 10 figures. Further, counter 17 is connected to decimal point indicator 18 through decoder 19. FIG. 6 shows the relationship between the register 6 and figure position. The counter 17 is a decimal counter having the same figure numbers as register 6 and can take 10 different states. These ten states are assigned numbers 0, 1, 2, 3, 4, 5, 6, 7, 8 and 9, respectively. The state where there is no input pulse in the counter is assumed as 0, and accordingly as the counter counts every one pulse, the states would be changed to 1, 2, 3, ..., and the signal numbers sent from the decoder equipped in the counter are accorded to the said state numbers.

When the state of the counter is state 5, it is expressed by $C_1=5$ and produce "1" at $C_1=5$. And the counter always corresponds to numerical value.

Accordingly, when a numerical value to be registered includes a decimal point, the set of the numerical value is made as follows:

For example, it is desired to register in the indicator the numerical value of 123.456. Firstly keys "1," "2" and "3" on key board 1 are successively depressed to register these numerics into register 6 from the figure LSD to higher order figures, respectively, and these numerics are expressed in indicator 7. Then decimal point key "." 3 is depressed to set flip-flop 9, the set output signal F being applied to the input of gate G–2 to set counter 17 to its counting state.

Then keys "4," "5" and "6" are successively depressed to permit the pulse generator 8 to produce 12 bit pulses for application to the converter 5 for converting the decimal coded three figures into binary code. These 12 pulses are frequencially divided into three digit pulses DP by the tetrarchy counter 16 to apply these DP pulses to input terminal 15 of gate G–2 to be counted by counter 17 set in the count state. When counter 17 counts three DP pulses, decoder 19 produces 1 at $C_1=3$ to light the decimal point illuminating lamp located at the position 3 of indicator 18. Then an order for operation is given by the depression of key 4 on key board 1 to flip-flop circuit 9, a reset signal RF is applied to terminal 11 to set circuit 9 nonconductive to prevent pulses coming from terminal 10.

According to the present invention, with an additional simple device in addition to the above explained numerical value indicator, figuring indication corresponding to the position of decimal point is automatically made. The principal concept of such a device is explained with respect to FIGS 7 through 10. Separation of the numerical value may be readily made for groupings of any number of digits, but in the explanation to be made the usual grouping of three digits will be used. Assuming the decimal coded numerical value of 0 1 2 3 4 5 6 7 8 9, and figuring this value with every three figures, three groups $A_1$, $A_2$ and $A_3$ are obtained as follows.

| | Figure Number Counted From The Least Significant Digit | | | | Lamp Group |
|---|---|---|---|---|---|
| Group $A_1$ | 1, | 4, | 7, | 10 | a |
| Group $A_2$ | | 2, | 5, | 8 | b |
| Group $A_3$ | | 3, | 6, | 9 | c |

Figure 7:
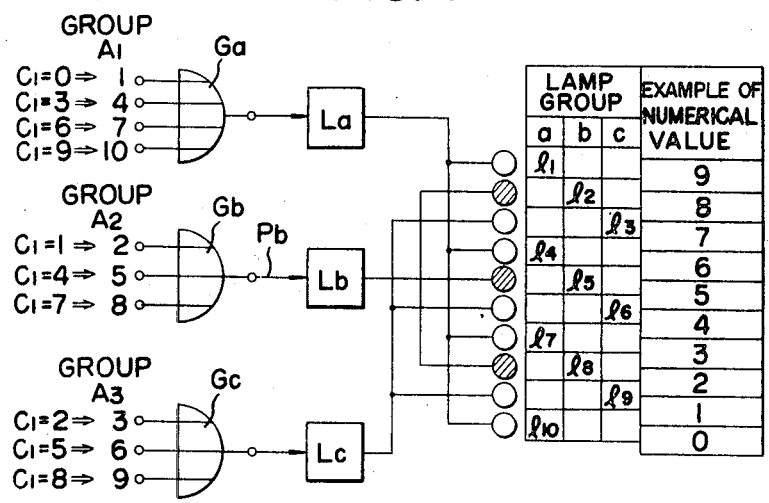
FIG. 7 shows the principle of theoretical circuit automatically figuring a numerical value.
Figure 8:
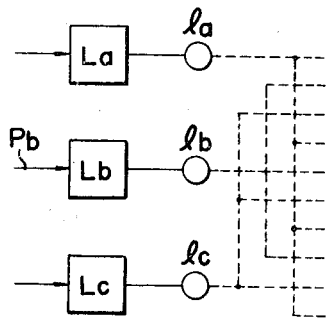
FIG. 8 shows the circuit shown in FIG. 7 combined with indicating lamps and their optical arrangement.

In FIG. 7, $A_1$, $A_2$ and $A_3$ indicate the above groups $A_1$, $A_2$ and $A_3$, respectively, and illuminating lamps are also grouped in three groups $a$, $b$ and $c$, respectively. Group $A_1$ and lamp group $a$, group $A_2$ and lamp group $b$ and group $A_3$ and lamp group $c$ are connected through "OR" circuits $G_a$, $G_b$ and $G_c$ and signal amplifiers $L_a$, $L_b$ and $L_c$, respectively. "OR"-circuits $G_a$, $G_b$ and $G_c$ are provided with input terminals corresponding to groups $A_1$, $A_2$ and $A_3$, respectively, to divide the input signals into three groups of (1, 4, 7, 10), (2, 5, 8) and (3, 6, 9). Amplifier $L_a$, $L_b$ or $L_c$ amplifies the corresponding signal of group $A_1$, $A_2$ or $A_3$, to light the corresponding lamp group $a$ ($l_a$, $l_4$, $l_7$, $l_{10}$), $b(l_2, l_5, l_8)$ or $c(l_3, l_6, l_9)$. Input terminals 1, 2, 3, 4, 5, 6, 7, 8, 9 and 10 of "OR" circuits $G_a$, $G_b$ and $G_c$ are, as shown in FIG. 7, connected to output terminals C=0, 1, 2, 3, 4, 5, 6, 7, 8, 9 of decoder 19.

Assuming that decimal point is at numeric 5, i.e., 012345.6789, and registering this numerical value, then output 1 is produced at output terminal $C_1=4$ of decoder 19. Since terminal $C_1=4$ is connected to input terminal 5 of "OR"-circuit $G_b$, the output signal from decoder 19 is applied to "OR"-circuit $G_b$, where output signal $P_b$ is obtained to be amplified by amplifier $L_b$ to light the lamps $l_2$, $l_5$, $l_8$ of lamp group $b$ of indicator 20 to exhibit the separation indications. Accordingly, the decimal point is indicated by decimal point indicator 18 and separation of the numerical value into groups of three digits are indicated by indicator 20 with the aid of lamps $l_2$, $l_5$, $l_8$, respectively. These indications are to be stressed by the positional indicator, i.e., numerical value indicator 7, decimal point indicator 18 and separation indicator 20, respectively, and when these indicators are overlappingly arranged, numerical value, decimal point and separation marks are clearly and readily observed.

Although the invention is described with reference to the embodiment for separation into three three-digit groupings, it is apparent that the invention is readily applicable for separation of the numerical value into two or four digit groups requiring two and four groupings, respectively.

Figure 9:
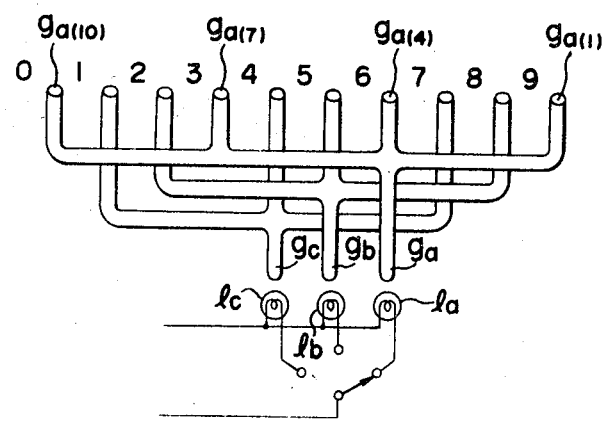
FIG. 9 is a plan view of an embodiment of the optical arrangement shown in FIG. 8, using light leading tubes.

FIG. 9 shows an improved illuminating device for FIG. 7 using light leading tubes. "OR"-circuits $G_a$, $G_b$ and $G_c$, and signal amplifiers $L_a$, $L_b$ and $L_c$ are connected in the manner similar to FIG. 7, however, amplifier $L_a$, $L_b$ or $L_c$ light only one lamp $l_a$, $l_b$ or $l_c$ to separate the numerical value.

In place of providing lamps $l_1$ through $l_{10}$ of FIG. 7, in FIG. 9, light leading tubes $g_a$, $g_b$ and $g_c$ are provided to lead light rays from lamps $l_a$, $l_b$ and $l_c$, respectively, to illuminate separation positions. In FIG. 9, when lamp $l_a$ is lighted, the light rays being guided by light leading tube $g_a$ to illuminate the first, fourth, seventh and 10th digits of the numerical value (0 1 2 3 4 5 6 7 8 9) through branches $g_{a(1)}$, $g_{a(4)}$, $g_{a(7)}$ and $g_{a(10)}$, respectively. With the provision of light leading tubes shown in FIG. 9, each of amplifiers $L_a$, $L_b$ and $L_c$ will only light lamps $l_a$ $l_b$ or $l_c$ with the result that because of the decrease of the number of lamps, the device becomes compact and economical. Light leading tubes may be made of glass or acrylic resin in the tubular and tree-branch form as shown in FIG. 9, with a surface coating of light-reflecting material except on the outer surfaces corresponding to lamp illuminating portions and figure indicating portion. Glass-fiber may be used as well as an optical system comprising lenses, prisms and reflecting mirrors.

In general, separation is not made for numerics positioned at lower orders than the order of decimal point but for those positioned at higher orders. For example, in the usual case, separation is made in the following manner:

012,345.6789

Figure 10:
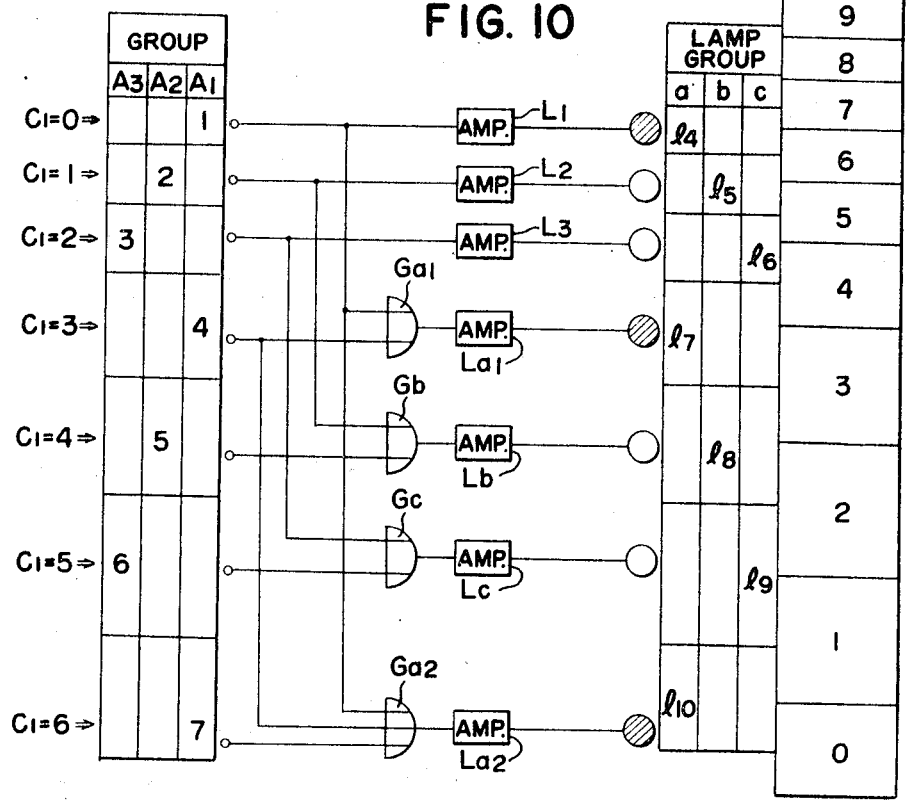
FIG. 10 shows a principle of figuring a numerical value of its higher orders than the order of the decimal point.

FIG. 10 shows an embodiment of such case, and in this embodiment numerical values having as much as 10 numerics are treated. $G_{a1}$, $G_b$, $G_c$ and $G_{a2}$ are "OR"-circuits and $L_1$, $L_2$, $L_3$, $L_{a1}$, $L_b$, $L_c$ and $L_{a2}$ are signal amplifiers, respectively. Similar to the embodiment of FIG. 7, input terminals 1 through 7 of groups $A_1$, $A_2$ and $A_3$, are connected to decimal point indicating signals $C_1=0$ through $C_1=6$, which are outputs of the decoder 19. It should be noted, that input terminals 8 through 10 of FIG. 7 have nothing to do with the embodiment of FIG. 10, and have therefore been omitted.

In FIG. 10, lamps $l_1$, $l_2$ and $l_3$ of FIG. 7 are unnecessary, since the lower order digits, i.e., 7, 8 and 9 of the above exemplified value, are unnecessary in separating those numerics unless separation is to be made for numerics of lower orders than the decimal point although the decimal point itself may be variably positioned. For this reason, terminal 8, 9 and 10 are not provided in groups $A_1$, $A_2$ and $A_3$. In addition, "OR" circuits for this embodiment, are constituted as follows:

Lamps $l_4$, $l_5$ and $l_6$ are connected to input terminals 1 of group $A_1$, 2 of group $A_2$ and 3 of group $A_3$ through amplifiers $L_1$, $L_2$ and $L_3$, respectively. Only when the decimal point locates the least significant digit, i.e., 0123456,789., that is, only when decimal point signal is applied to terminal 1 of group $A_1$, lamp $l_4$ is lit. Similarly, only when decimal point locates the second from the last digit, i.e., 012345,678.9, that is, only when decimal point signal is applied to input terminal 2 of group $A_2$, $l_5$ is lit to indicate the separation. And $l_6$ is lit only when the decimal point signal is applied to input terminal 3 of group $A_3$. Lamp $l_7$ is lit when decimal point locates at either the first (the least significant digit) or the fourth figure and for this purpose, "OR"-circuit $G_{q1}$ is connected to input terminals 1 and 4 of group $A_1$ through amplifier $L_{a1}$ which lights lamp $l_7$. Similarly, lamp $l_8$ is connected through amplifier $L_b$ to "OR"-circuit $G_b$, which is connected to terminals 2 and 5 of group $A_2$. Similarly, lamps $l_9$ and $l_{10}$ are connected to "OR"-circuits $G_c$ and $G_{a2}$ through amplifiers $L_c$ and $L_{a2}$, respectively.

For example, the decimal point locates the least significant digit, i.e., 0,123,456,789., then the decimal point signal is produced at $c_1=0$ of decoder 19 to indicate the decimal point by indicator 18 and the signal is simultaneously applied to input terminal 1 of group $A_1$. Thus lamp group $a$ comprising $l_4$, $l_7$ and $l_{10}$ is lit to indicate the separation at the fourth, seventh and 10th digits.

When the decimal point locates at the second digit, i.e., 012,345,678.9, the decimal point signal is produced at $c_1=1$ of decoder 19 and applied to input terminal 2 of group $A_2$. Thus lamp group $b$ comprising $l_5$ and $l_8$ is lit to indicate separation at the fifth and eighth digits.

Figure 11:
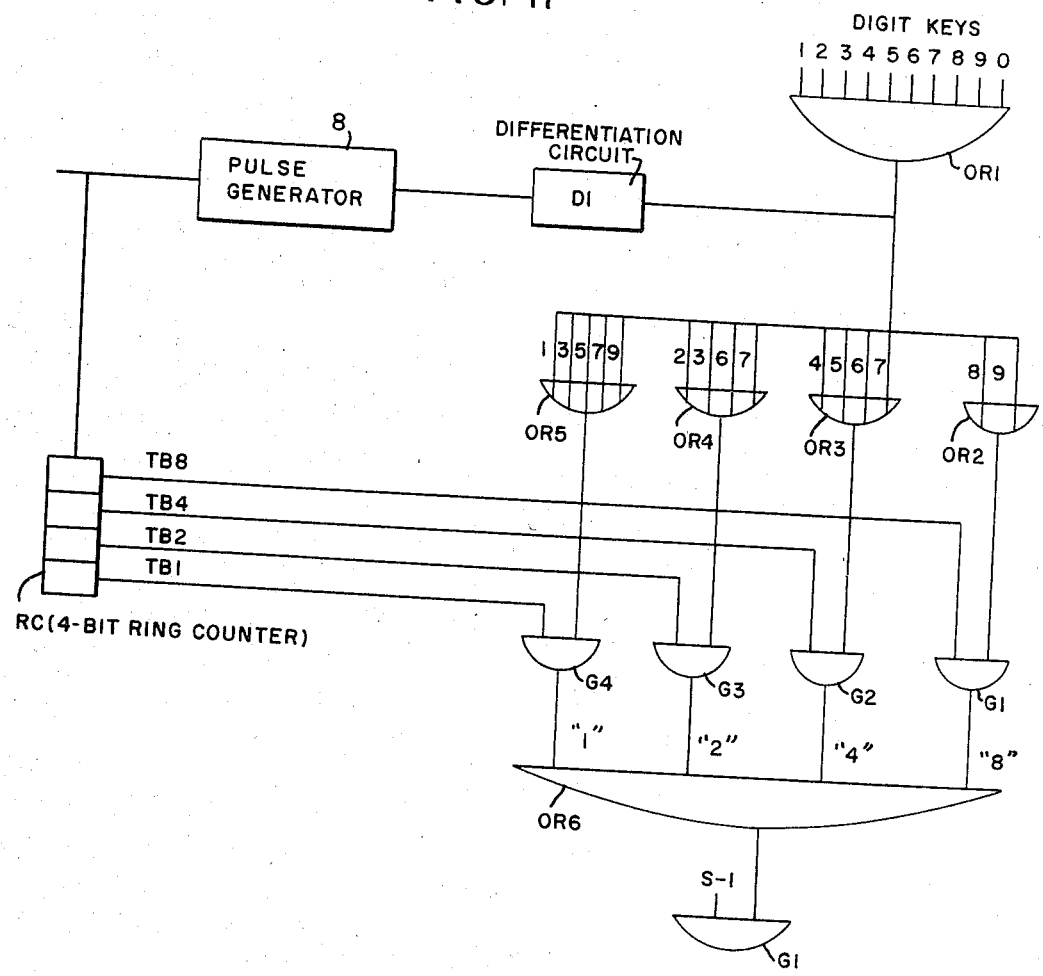
FIG. 11 shows a circuit diagram of a numerical converter advantageously applicable in the present invention.

Referring to FIG. 11, there is shown a conventional numerical converter which is advantageously applicable to the present invention. OR-circuit OR1 has 10 inputs corresponding to the keys on the keyboard. OR-circuit OR1 is energized by depressing each of the keys. In response to the depression of a key, the output signal from OR circuit is applied to the inputs of OR-circuits OR2, OR3, OR4, and OR5. It should be noted that the arrangement is such that OR-circuits OR2, OR3, OR4, and OR5 have weights "8," "4," "2" and "1," respectively. Thus, the output signal from OR-circuit OR1 is applied to suitable OR-circuits OR2 through OR5 in accordance with the weight thereof. With the arrangement as shown, to OR-circuit OR2 are applied inputs corresponding to the digit keys 8 and 9 on the key board. To OR-circuit OR3 are applied inputs corresponding to the digit keys 4, 5, 6 and 7, and to OR-circuit OR4 are applied inputs corresponding to the digit keys 2, 3, 6 and 7. Similarly, to OR-circuit OR5 are applied inputs corresponding to the digit keys 1, 3, 5, 7 and 9.

Figure 12:
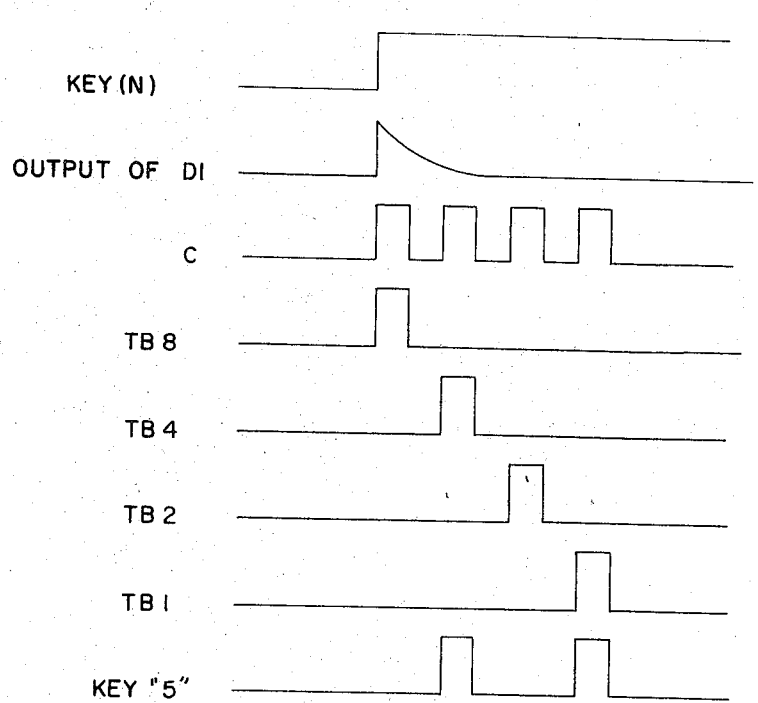

The differentiation circuit D1 differentiates output signal received from OR-circuit OR1 in responsive to the depression of the digit key. The pulse generator 8 generates four pulses C upon receipt of one differentiated pulse DP from the differentiation circuit D1. Four pulses are applied to the ring counter RC and circulate in the ring counter. The first pulse sets a weight 8 flip-flop. The output pulse TB8 is applied to AND-gate G1 to open it. The second pulse generated by the pulse generator sets a weight 4 flip-flop to apply output pulse TB4 to AND-gate G2 to open it. Similarly, the third and fourth pulses set weight 2 and 1 flip-flops to supply weighted pulses TB2 and TB1 to AND-gates G3 and G4 to open the respective gates. The gates G1 through G4 pass digit output pulses corresponding to the depressed digit key by ANDing the pulses from the OR circuits and the weighted pulses from the ring counter. The output pulses from the AND gates are applied to AND-gate G-1 through OR-gate OR6. Assuming that the digit key corresponding to digit 5 is depressed, as shown in FIG. 12, key output corresponding to digit 5 passes through OR-circuits OR3 and OR5, and the output signals from OR circuits and ANDed with weighted pulses TB4 and TB1 from the ring counter RC by AND-gates G2 and G4 which, in turn, apply output pulses having weights 4 and 1 to OR-gate OR6. The collected output pulses are applied to the input of AND-gate G-1. The signal produced from AND gate is applied to the least significant digit of the shift register, as shown in FIG. 3.

Figure 13:
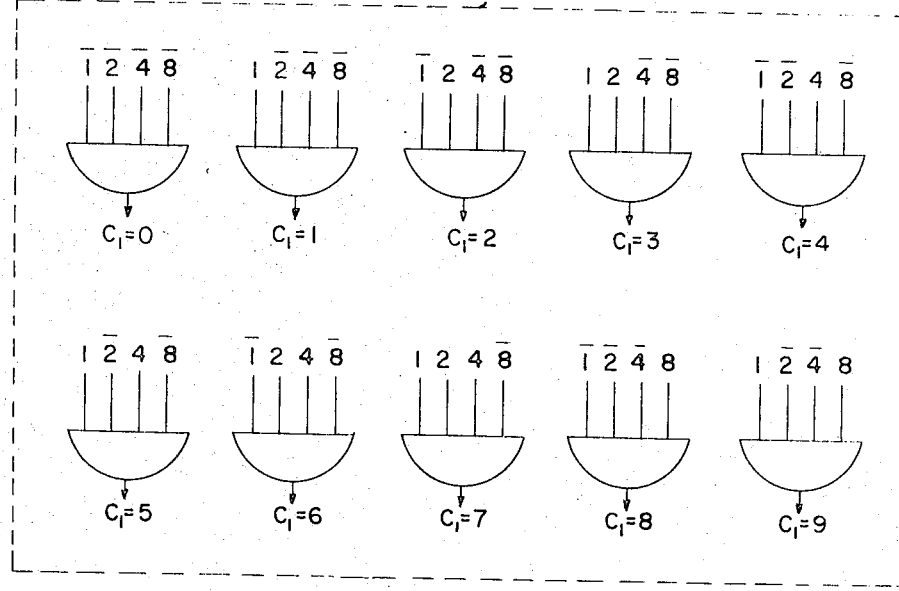
FIG. 13 shows a simplified circuit diagram of decoder applicable in the present invention.

Referring to FIG. 13, there is shown conventional decoder in simplified form, which is effectively applicable to the present invention. The decoder illustrated comprises 10 AND gates, and each AND gate has four inputs. These four inputs are connected to corresponding outputs of the counter 17. More specifically, in the exemplified arrangement, four inputs 1, 2, 4 and 8 are connected to corresponding set output terminals of the counter 17 and the inputs 1, 2, 4 and 8 are connected to corresponding reset output terminals of the counter 17. The connections of the inputs of the decoder 19 to the outputs of the counter 17 are not shown, such connections being well known.

The decoder 19 as shown in FIG. 13 receives weighted signals corresponding to weights, 1, 2, 4 and 8 and 1, 2, 4 and 8 from the counter 17. More specifically, the inputs 1, 2, 4 and 8 of AND gates in the decoder 19 receive the weighted signals as signal "1" appears at the outputs of the counter 17. The inputs 1, 2, 4 and 8 of AND gates in the decoder receive the weighted signals as signal "0" appears at the outputs of the counter 17. AND gates are opened upon receipt of corresponding weighted signals from the counter. For example, the third AND gate which has the inputs 1, 2, 4 and 8 is opened upon receipt of the weighted signal 0, 1, 0, 0 from the counter.

Table 1 as set forth below shows the relationship between the contents of the counter and outputs of AND gates in the decoder.

| outputs of AND gates | contents of counter | | | |
|---|---|---|---|---|
| | 8 | 4 | 2 | 1 |
| $C_1=0$ | 0 | 0 | 0 | 0 |
| $C_1=1$ | 0 | 0 | 0 | 1 |
| $C_1=2$ | 0 | 0 | 1 | 0 |
| $C_1=3$ | 0 | 0 | 1 | 1 |
| $C_1=4$ | 0 | 1 | 0 | 0 |
| $C_1=5$ | 0 | 1 | 0 | 1 |
| $C_1=6$ | 0 | 1 | 1 | 0 |
| $C_1=7$ | 0 | 1 | 1 | 1 |
| $C_1=8$ | 1 | 0 | 0 | 0 |
| $C_1=9$ | 1 | 0 | 0 | 1 |

The output signals from the decoder are applied to the decimal point indicator 18 as well as to the figuring indicator 20.

Accordingly, when the position of the decimal point is automatically indicated, separation is automatically made on the basis of the position of the decimal pint, which enables easy and rapid reading of the numerical values having significant numbers of digits and is advantageously applied for computers or automatic control devices.

It will be understood that this invention is not limited to the specific embodiments disclosed in this specification, but can be carried out with various modifications without departing from the scope of the invention, as defined in the appended claims.

What is claimed is:

1. Positional indicating device for numerical values, comprising a plurality of electrical indicators, each of which is provided in association with each digit of the numerical value indicator; means for dividing said indicators into a plurality of groups, each group including a certain number ($m$) of digits included in the numerical value indicator on the basis of the position of the decimal pint, said means including a plurality of OR circuits connected to said $m$ groups of indicators; means for electrically combining the electrical indicators within each group through the OR circuits, decimal point signal generating means producing a signal corresponding to a figuring position to be given as an input to one of the OR circuits for automatically selecting one of the $m$ digit groups of the indicators by the signal, the OR circuits being combined so as to provide the figuring indication only for higher order figures than the order of the decimal point.

2. Positional indicating device according to claim 1, wherein light leading means is provided for optically combining each of the groups divided by the OR circuits with one of the indicators within the group.

3. A numerical value indicator comprising a plurality of electrical digit grouping indicators for grouping the digits of a numerical value into groups of "$n$" digits with respect to the position of a variably positionable decimal pint, decimal point indicators positioned in association with each digit of the numerical value, one only of which decimal point indicators is operated at any one time to indicate the particular position of the decimal point within the numerical value, one of the digit grouping indicators being positioned in association with each digit of the numerical value, the digit grouping indicators being divided into a plurality of arrangements such that the digit grouping indicators associated with every "$n$" digit are connected into one arrangement, means for selecting from the plurality of arrangements the one which includes the digit grouping indicator positioned at the same location as the operated decimal point indicator, a plurality of "OR" circuits connected to each of said arrangements of digit grouping indicators, decimal point signal generating means producing a signal corresponding to a digit grouping position to be given as an input to the corresponding one of the "OR" circuits thus selecting the arrangement associated with that "OR" circuit, and means for actuating the digit group indicators connected to the selected arrangement.

4. A numerical value indicator according to claim 3, in which "OR" circuits and the digit grouping indicators are combined so as to operate only those digit grouping indicators positioned after higher order digits than the decimal point.

* * * * *